(12) United States Patent
Janeczko et al.

(10) Patent No.: US 7,804,651 B2
(45) Date of Patent: Sep. 28, 2010

(54) FLAT FIELD EYEPIECE

(75) Inventors: Donald Janeczko, Fincastle, VA (US);
John Michael Hall, Amherst, NH (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 0 days.

(21) Appl. No.: 12/277,761

(22) Filed: Nov. 25, 2008

(65) Prior Publication Data

US 2010/0128355 A1  May 27, 2010

(51) Int. Cl.
*G02B 25/00* (2006.01)
(52) U.S. Cl. .................. 359/643; 359/646; 359/644
(58) Field of Classification Search .......... 359/643–646
See application file for complete search history.

(56) References Cited

U.S. PATENT DOCUMENTS

| | | | |
|---|---|---|---|
| 2,217,281 A | 1/1939 | Konig | |
| 2,267,832 A * | 12/1941 | McCarthy | 359/794 |
| 2,528,468 A * | 10/1950 | Cojan | 359/646 |
| 2,823,583 A * | 2/1958 | Altman et al. | 359/776 |
| 2,885,928 A | 3/1958 | Baker | |
| 2,900,871 A | 8/1959 | Baker | |
| 3,158,677 A * | 11/1964 | Lacomme et al. | 359/646 |
| 3,472,577 A * | 10/1969 | Rosin et al. | 359/645 |
| 3,658,412 A | 4/1972 | Seaman | |
| 3,823,999 A | 7/1974 | Versteeg | |
| 4,111,528 A | 9/1978 | Versteeg | |
| 7,211,778 B1 | 5/2007 | Smith et al. | |

OTHER PUBLICATIONS

International Search Report and Written Opinion, Mar. 23, 2010.
Jenkins and White, "Fundamentals of Optics", 1976, McGraw-Hill, XP002560467, Title page, Bibliographic page; pp. 206-207.
Warren J. Smith, "Modern Optical Engineering", 1966, McGraw-Hill, XP002560468, Title page, Bibliographic page; p. 360.
Lord C J R, "Evolution of the Astronomical Eyepiece Passage", Monograph, Feb. 1, 1997 pp. 1-55, XPoo2467282, p. 26.

* cited by examiner

*Primary Examiner*—Darryl J Collins
(74) *Attorney, Agent, or Firm*—RatnerPrestia

(57) ABSTRACT

A lens system includes a first lens axially aligned with a second lens, where the first and second lenses are configured to be sequentially positioned from a pupil image of a viewer. The second lens is formed as a triplet having three cemented elements. The second lens includes a convex surface facing the first lens, and a flat surface opposing the convex surface of the second lens. The first lens includes a concave surface opposing a flat surface of the first lens; the second lens includes a concave surface and a convex surface; and the concave surface of the first lens and the concave and convex surfaces of the second lens have equal radii of curvatures.

9 Claims, 7 Drawing Sheets

FLAT FIELD EYEPIECE

FIELD OF THE INVENTION

The present invention relates, in general, to an eyepiece or magnifier and, more particularly, to an eyepiece or magnifier used in night vision goggle systems and head mounted displays.

BACKGROUND OF THE INVENTION

Night vision goggles and head mounted displays require eyepieces or magnifiers that are color corrected for red, green and blue, with high image quality having modulation transfer functions (MTFs) greater than 50% at 40 line pairs per millimeter (lp/mm). These eyepieces or magnifiers cooperate with displays or screens of image tubes to bring images to the eyes of viewers. These eyepieces or magnifiers also require long eye relief greater than 20 mm, so that a viewer may have more tolerance in positioning his eyes to view an image.

A good eyepiece/magnifier must be insensitive to the position of the eye, because in a magnifier there is no exit-pupil-image of an objective lens to define the location of a user's eye. This requires a better level of correction, especially for spherical aberration so that the image does not swim or distort as the eye is moved around.

Examples of magnifiers disclosed in US patents are U.S. Pat. Nos. 2,885,928 and 2,900,871 issued in 1959 to James G. Baker; and U.S. Pat. Nos. 3,823,999 and 4,111,528 issued in 1974 and 1978, respectively, to Frits Johan Versteeg.

Eyepieces/magnifiers have been used to view a phosphor screen of a night vision image tube. These eyepieces, however, are difficult and expensive to manufacture. In addition, these image tubes required curved screens to aid in the correction of field curvature aberrations.

In the 1990s, eyepieces/magnifiers typically were configured similarly to the Qioptiq lens illustrated in FIG. 1. As shown, lens 10 includes three spherical glass lenses 13, 14 and 15; and one glass cemented doublet 11 and 12. Lens 10 provides good quality color image having an MTF greater than 50% at 40 lp/mm. Lens 10 receives an image from a curved surface of a phosphor screen, designated as 16, and transmits it to the eye of a viewer. Due to the number of lenses and their curvatures, lens 10 is difficult and costly to manufacture. Since lenses 13 and 14 are thin, they tend to fracture during manufacture, thereby resulting in low yields.

In the 2000s, an eyepiece was developed for use with both displays and screens, as shown in FIG. 2. As shown, lens 20 includes glass lens 21, plastic asphere lens 22 and plastic hybrid (diffractive) lens 23. Also included is a prism, which is comprised of two glass plates 24 and 25 for combining light projected from anode screen 26 and light projected from another display (not shown). Lens 20 introduces harmonics, however, that result in multiple images unacceptable to a viewer. The harmonics are due to steep angles of incidence at the diffractive lens.

In 2005, Edmund developed an eyepiece for use with both displays and screens, as shown in FIG. 3. As shown, lens 30 includes three glass lenses 32, 33 and 34 and plastic asphere lens 34. Also included is a prism, which is comprised of two glass plates 35 and 36 for combining light projected from anode screen 37 and light projected from another display (not shown). The addition of a fourth lens in lens 30 proved to be inadequate.

In 2007, Northrup Grumman designed an eyepiece illustrated in FIG. 4. As shown, lens 40 includes two glass doublets, positioned sequentially as first doublet 42 and 43, and second doublet 44 and 45. Also included are three glass lenses 41, 46 and 47. Thus, lens 40 is formed entirely from glass substances. However, lenses 46 and 47 include asphere surfaces for providing spherical correction. The lens 40 performs well but is expensive to produce. The lens has a wide field of view which is greater than 50 degrees. The lens, however, has no ability to combine an image projected from a display (not shown) with an image projected from screen 48, shown as rays of light 49 projecting towards the eye of the viewer (also indicated as eye pupil 49).

For fields of view that are less than 40 degrees, a glass doublet provides a cost effective eyepiece/magnifier having good image quality. As the field of view increases, or as a beam combiner is added, however, the eyepiece/magnifier becomes more complicated, resulting in a lens having five elements or more. In addition, the eyepiece/magnifier requires multiple aspheres for spherical correction. The eyepiece/magnifier, thus, results in a complex and expensive design, without good fusing capability.

The present invention, as will be explained, provides a cost effective eyepiece/magnifier that may combine an image projected from a display with an image formed directly on a screen/anode projected by an objective lens of a night vision goggle system. The combined images may be projected toward the viewer with a wide field of view. In addition, the eyepiece/magnifier may be formed from individual lenses having no flat surfaces, no asphere surfaces and no diffractive surfaces. Furthermore, the eyepiece/magnifier may project a wide field of view from a flat or curved screen surface.

SUMMARY OF THE INVENTION

To meet this and other needs, and in view of its purposes, the present invention provides an eyepiece/magnifier including a first lens axially aligned with a second lens, where the first and second lenses are configured to be sequentially positioned from a pupil image of a viewer. The second lens is formed as a triplet having three cemented elements. The second lens includes a convex surface facing the first lens, and a flat surface opposing the convex surface of the second lens. The first lens includes a concave surface opposing a flat surface of the first lens; the second lens includes a concave surface and a convex surface; and the concave surface of the first lens and the concave and convex surfaces of the second lens have equal radii of curvatures. The second lens diverges light toward the first lens, and the first lens converges light emitted from the second lens.

The eyepiece/magnifier receives light from an image screen, aligned axially along an optical line of the first and second lenses. The light is sequentially projected from the image screen toward the second lens, toward the first lens and then toward the viewer. The light passing from the image screen to the viewer is free-of passing through any aspherical surfaces and free-of passing through any diffractive surfaces. A beam combiner is provided between the lenses and the image screen, in axial alignment along the optical line; a display is provided substantially perpendicular to the optical line, and light emitted from the display and light emitted from the image screen are combined by the beam combiner for viewing by the viewer.

The first and second lenses are configured for providing a field of view greater than 55 degrees, and a modulation transfer function (MTF) better than 50% at 40 line pairs/mm. The image screen is aligned axially along an optical line with the first and second lenses for viewing by the viewer. The image screen includes a surface facing the first and second lenses that is substantially flatter than a surface having a 100 mm radius of curvature.

The first and second lenses are configured to have an effective focal length (EFL) of approximately 20.5 mm and an eye relief greater than 24 mm.

Another embodiment of the invention includes a night vision goggle (NVG) system mounted on a helmet worn by a viewer. The NVG system includes an image intensifier having, in sequence, an objective lens, a multi-channel plate (MCP) and an anode screen for forming a first image. An eyepiece is positioned in back of the anode screen for projecting the first image to the viewer. An infrared imager with a color display is included for displaying a second image.

A beam combiner is included for passing one, or both of the first image and the second image towards the viewer. The eyepiece includes a first lens axially aligned with a second lens; the second and first lenses are, respectively, positioned in sequence from the anode screen; and the second lens is formed as a triplet having three cemented elements. The first lens includes a flat surface facing the viewer, and a convex surface opposing the flat surface. The second lens includes a convex surface facing the first lens; and a flat surface facing the anode screen. The first lens includes a convex surface facing the second lens; the second lens includes a concave surface and a convex surface; and the convex surface of the first lens and the concave and convex surfaces of the second lens have equal radii of curvatures.

Yet another embodiment of the invention is a method for magnifying an image comprising the steps of: (a) positioning, along an optical path, first and second lenses, and (b) transmitting, by the first and second lenses, an image formed at an anode screen of a night vision goggle (NVG) system toward a viewer, where the first lens as a singlet lens and the second lens is a triplet lens. Positioning includes placing in sequence the first and second lenses along the optical path between the viewer and the anode screen. Transmitting also includes diverging rays of light emitted from the anode screen by the second lens, and converging the rays of light emitted from the second lens by the first lens.

The method may further include the steps of: positioning along the optical path a beam combiner for receiving first rays of light from the anode screen; positioning, substantially perpendicular to the optical path, a display for emitting second rays of light toward the beam combiner; and merging the first and second rays of light by the beam combiner for viewing by the viewer. The first rays of light may be formed by an objective lens of an image intensifier, and the second rays of light emitted from the display may be formed by an infrared imager.

It is understood that the foregoing general description and the following detailed description are exemplary, and are not restrictive of the invention.

BRIEF DESCRIPTION OF THE FIGURES

The invention may best be understood from the following detailed description when read in connection with the accompanying figures.

DETAILED DESCRIPTION OF THE INVENTION

The present invention, as described below, provides a cost effective eyepiece/magnifier that may combine an image produced from a display with an image formed directly from an objective lens. The combined images may be projected toward a viewer with a wide field of view. In addition, the eyepiece/magnifier may be formed from individual lenses having no flat surfaces, no asphere surfaces and no diffractive surfaces. Furthermore, the eyepiece/magnifier may project a wide field of view from a flat or curved screen surface.

Figure 1:
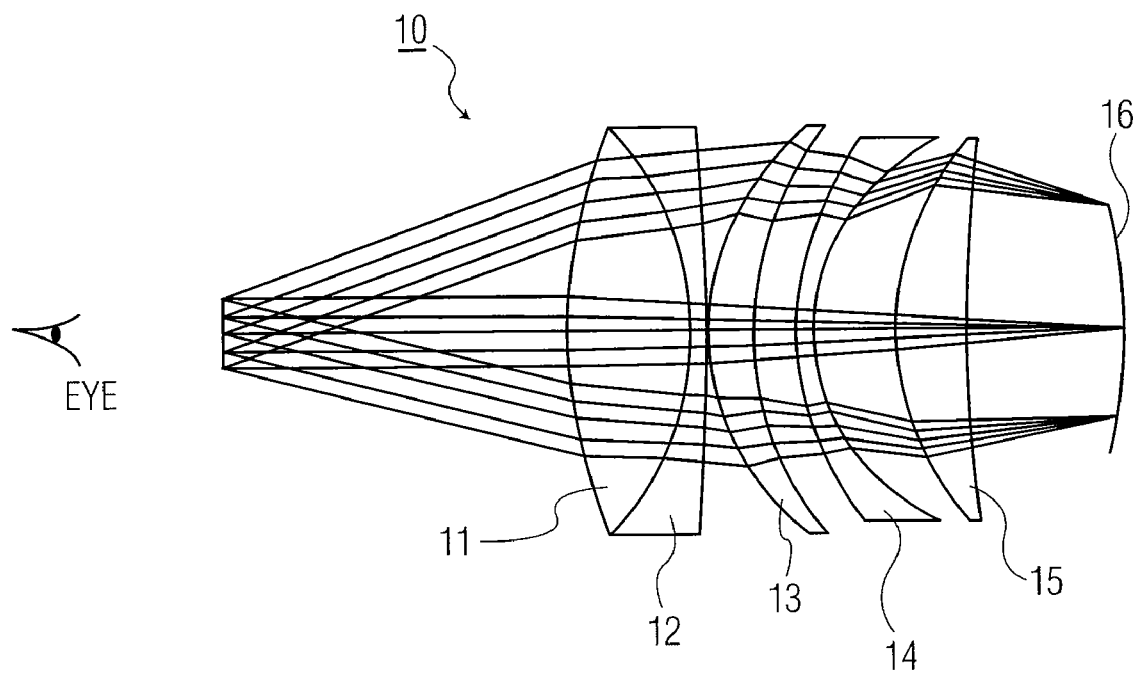
FIG. 1 is a conventional lens system comprised of several lenses.
Figure 2:
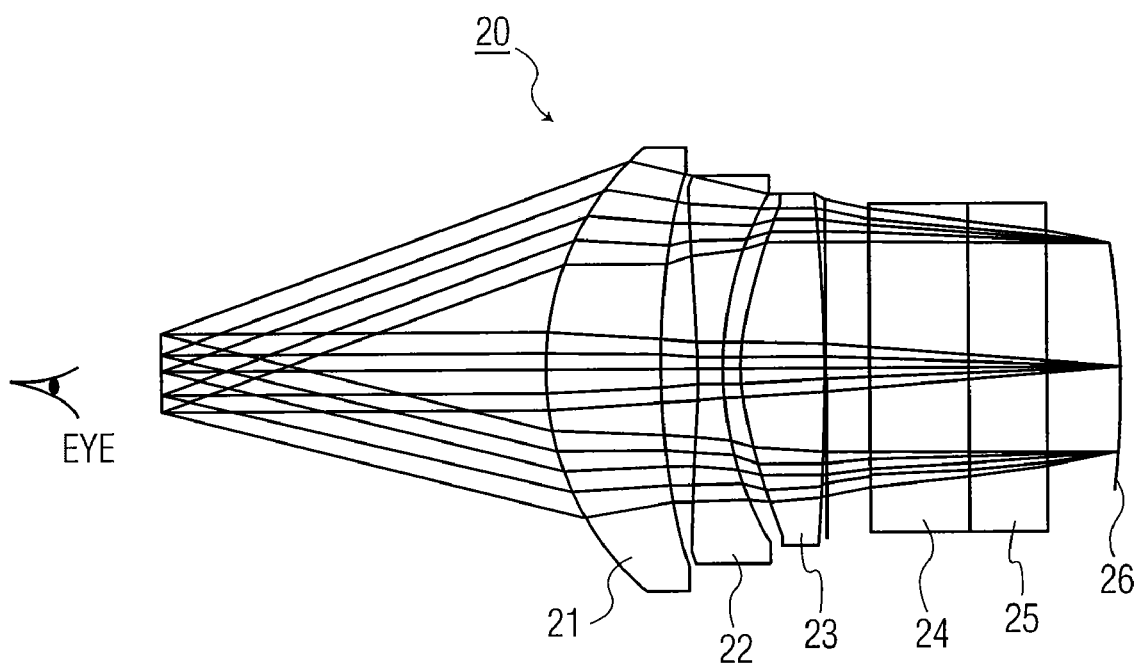
FIG. 2 is another conventional lens system comprised of several lenses.
Figure 3:
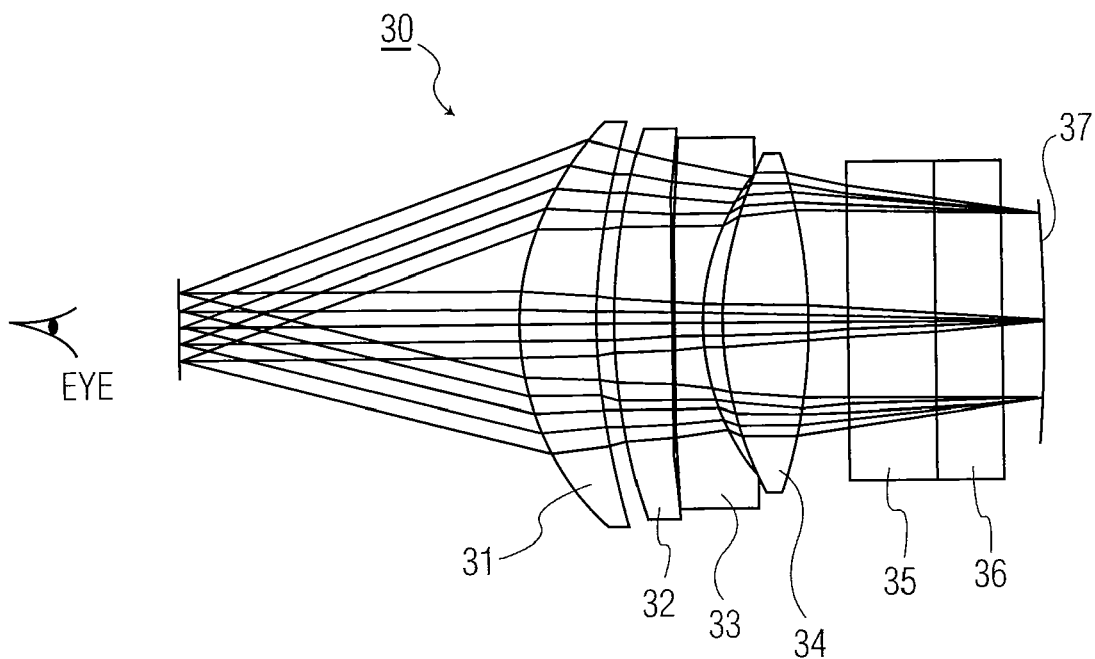
FIG. 3 is yet another conventional lens system comprised of several lenses.
Figure 4:
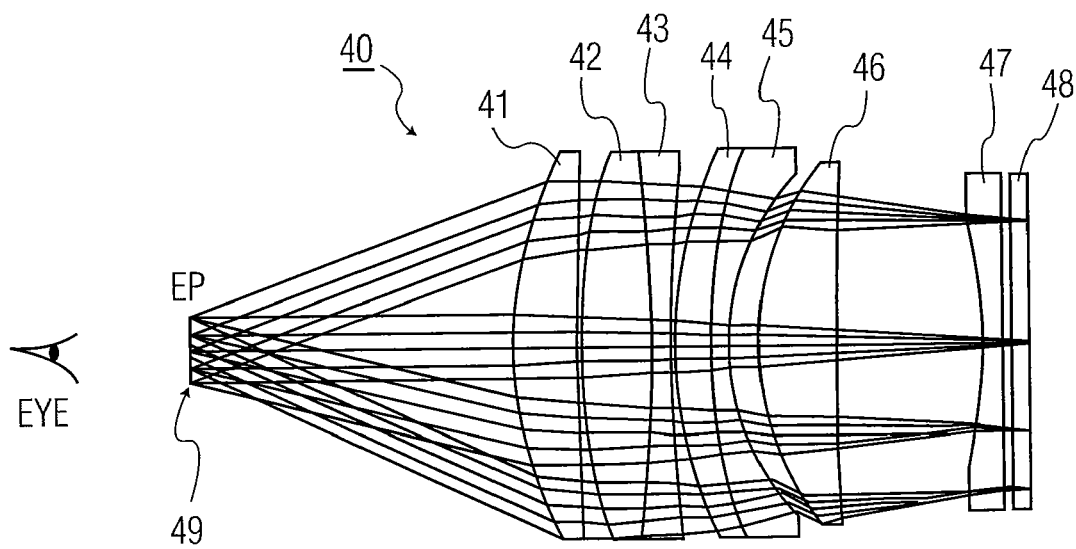
FIG. 4 is still another conventional lens system comprised of several lenses.
Figure 5:
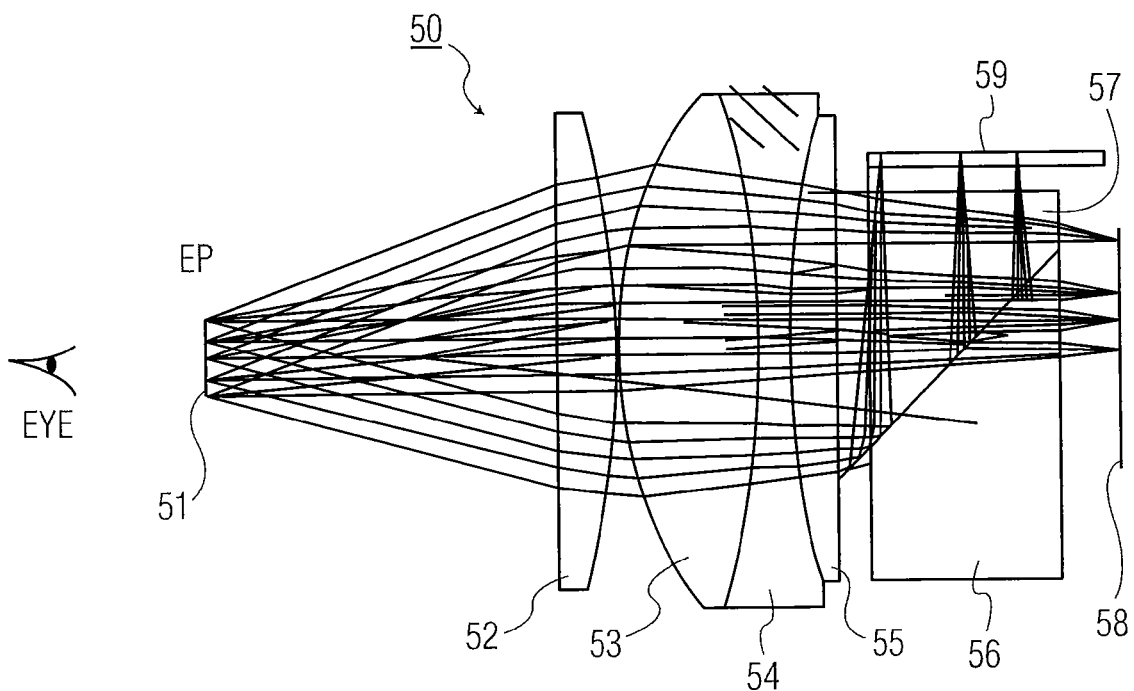
FIG. 5 is a lens system, in accordance with an embodiment of the present invention, for combining light projected from two different displays by way of a beam combiner.

An embodiment of the present invention is shown in FIG. 5 as eyepiece/magnifier 50, sometimes also referred to herein as eyepiece 50 or magnifier 50. As shown, eyepiece 50 includes one glass triplet formed from three glass singlets, designated as 53, 54 and 55. Eyepiece 50 also includes a glass singlet, designated as 52, which is positioned between eye pupil 51 and the glass triplet. The image formed at eye pupil 51 is defined herein as an image formed at the back of eyepiece 50.

The present invention includes a beam combiner formed from two glass prisms 56, 57 for merging an image formed on display 59 with an image formed on screen 58. The combined images are projected toward the eye pupil, designated as 51. The image formed on screen 58, for example, is defined herein as an image formed at the front of eyepiece 50.

It will be appreciated that an image may be formed on display 59 from another set of optical elements that are not shown in FIG. 5. For example, the set of optical elements may be lenses for providing an image produced by an IR imager (not shown). The image formed by the IR imager may be seen on display 59, where the display may be a TV display providing color images of objects viewed by the IR imager.

It will be understood that the image formed on screen 58 may be an image produced by an objective lens (not shown) of a night vision goggle system mounted on a helmet worn by a person, such as a soldier. The eyepiece 50 may receive image light from screen 58 and magnify it for viewing at eye pupil 51. Thus, the image projected for viewing may be a single image from screen 58, a single image from display 59, or a combined image from both screen 58 and display 59.

When the images are merged by prisms 56, 57, the image quality is excellent and results in a field of view (FOV) wider than 55 degrees. The display 59 may be a flat display and screen 58 may also have a flat surface, or a slightly curved surface that is greater than 100 mm radius of curvature (for example). The combined image produced by eyepiece 50 has a quality that is better than 50% at 40 line pairs/mm.

It will be appreciated that beam combiner 56, 57 (or prisms 56, 57) may be omitted entirely in FIG. 5, when it is desirable to produce an image tube screen that sees only a single image, which is formed at eye pupil 51 by an objective lens. Of course, display 59 would then also be omitted in FIG. 5.

The eyepiece 50 is, thus, a cost effective magnifier including a triplet lens. The inventor discovered that a triplet lens may advantageously be used in an eyepiece to form a magnified image with excellent image quality and a wide field of view. Such triplet lens is easy to produce without incurring expense resulting from broken curved single lenses.

An exemplary specification for forming lens 50 is provided in Table 1 listing lens surface data in Zemax format. Section A of the table provides a summary of the reflected configuration, starting from an object positioned at infinity (the left side of FIG. 5) and moving toward the beamsplitter surface of glass combiner plates 56, 57; and moving up from the beamsplitter surface toward the surface of display 59. Section B of the table, on the other hand, provides a summary of the transmitted configuration, starting from an object positioned at infinity (the left side of FIG. 5) and moving toward the beamsplitter surface; and moving through the beamsplitter surface to the surface of anode screen 58. As shown, the display surface is flat (radius of infinity) and the anode screen surface is slightly curved having a radius of 110 mm (concave as viewed from pupil image 51).

The thickness, the diameter, the type of glass and the radius of each surface of lens system 50 are also listed in Table 1.

TABLE 1

Exemplary specification for forming lens system 50 of FIG. 5.
SURFACE DATA SUMMARY (Zemax Format)
Effective Focal Length: 22.0552
Image Space F/#: 3.676
Paraxial Image Height: 10.285
Maximum Half Field: 25 degrees Primary Wavelength: 0.6 μm

| Wavelength Number | Wavelength (μm) | Weight |
|---|---|---|
| 1 | 0.55 | 0.2 |
| 2 | 0.6 | 1 |
| 3 | 0.65 | 0.2 |

| Surf | Type | Radius | Thickness | Glass | Diameter |
|---|---|---|---|---|---|
| A. Reflected Configuration to display | | | | | |
| OBJ | STANDARD | Infinity | Infinity | | |
| STO | STANDARD | Infinity | 24 | | 5 |
| 2 | STANDARD | Infinity | 4 | S-LAH58 | 32 |
| 3 | STANDARD | −57.4432 | 0.1 | | 32 |
| 4 | STANDARD | 28.42211 | 9.75 | S-LAH58 | 34.4 |
| 5 | STANDARD | −57.4432 | 2 | S-NPH2 | 34.4 |
| 6 | STANDARD | 57.44315 | 3.25 | S-LAH58 | 31 |
| 7 | STANDARD | Infinity | 2.2 | | 31 |
| 8 | STANDARD | Infinity | 6.5 | S-LAH60 | 18.81719 |
| 9 | COORDBRK | — | 0 | | — |
| 10 | STANDARD | Infinity | 0 | MIRROR | 21.77322 |
| 11 | COORDBRK | — | 0 | | — |
| 12 | STANDARD | Infinity | −10.5 | S-LAH60 | 23.6242 |
| 13 | STANDARD | Infinity | 0 | | 19.26818 |
| 14 | STANDARD | Infinity | −1.5207 | | 17.17754 |
| 15 | STANDARD | Infinity | −0.91 | BK7 | 17.17754 |
| IMA | STANDARD | Infinity | | | 8 |

TABLE 1-continued

Exemplary specification for forming lens system 50 of FIG. 5.
SURFACE DATA SUMMARY (Zemax Format)
Effective Focal Length: 22.0552
Image Space F/#: 3.676
Paraxial Image Height: 10.285
Maximum Half Field: 25 degrees

| | | | | | |
|---|---|---|---|---|---|
| B. Transmitted Configuration to Screen | | | | | |
| OBJ | STANDARD | Infinity | Infinity | | |
| STO | STANDARD | Infinity | 24 | | 5 |
| 2 | STANDARD | Infinity | 4 | S-LAH58 | 32 |
| 3 | STANDARD | −57.4432 | 0.1 | | 32 |
| 4 | STANDARD | 28.42211 | 9.75 | S-LAH58 | 34.4 |
| 5 | STANDARD | −57.4432 | 2 | S-NPH2 | 34.4 |
| 6 | STANDARD | 57.44315 | 3.25 | S-LAH58 | 31 |
| 7 | STANDARD | Infinity | 2.2 | | 31 |
| 8 | STANDARD | Infinity | 6.5 | S-LAH60 | 21.22 |
| 9 | STANDARD | Infinity | 6.5 | S-LAH60 | 23.6242 |
| 10 | STANDARD | Infinity | 4.256 | | 21.22 |
| IMA | STANDARD | −110 | 16.167 | 0 | |

Figure 6:
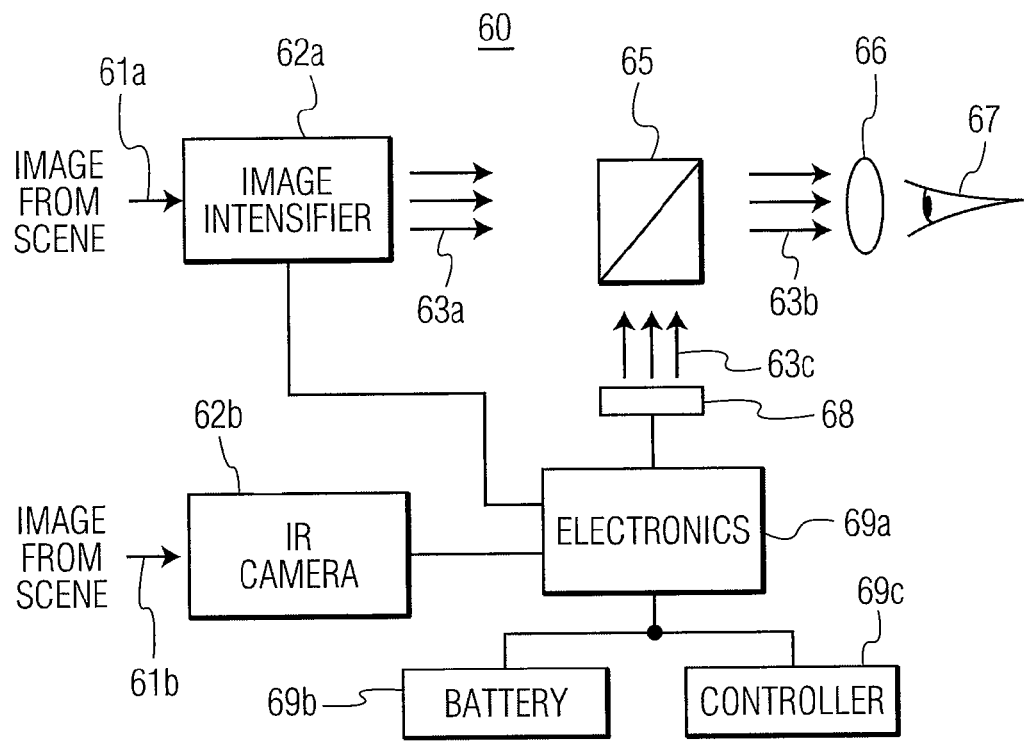
FIG. 6 is block diagram of a night vision goggle (NVG) system capturing images with two separate sensors, which are combined by a beam combiner for viewing, by way of the lens system of FIG. 5, in accordance with an embodiment of the present invention.

FIG. 6 shows an exemplary embodiment in which lens system 50 or eyepiece 50 of the present invention may be used. As shown, a night vision goggle (NVG) system, generally designated as 60, includes an image intensifier 62a, a second channel sensor, such as an infrared camera 62b, a beam combiner (or beamsplitter) 65 and an eyepiece 66 for viewing by an eye 67.

The eyepiece 66, shown in FIG. 6, may correspond to eyepiece 50 shown in FIG. 5. An eyepiece/magnifier, in general, is also referred to herein as a lens system.

The image intensifier 62a is configured to focus visible and near infrared light from a sensed image 61a onto an image intensifier tube. The image intensifier tube is preferably a known $I^2$ tube, which generally includes a photo-cathode that converts the light photons to electrons, a multi-channel plate (MCP) that accelerates the electrons and a phosphor screen that receives the accelerated electrons and creates a luminance in response to the accelerated electrons. The image created by image intensifier 62a is directed along an image intensified input path, as indicated by arrow 63a, to a beamsplitter 65. The beamsplitter may combine and/or split received beams, and is also referred to herein as a beam combiner.

The eyepiece 66 is substantially co-axial with image intensifier 62a and beamsplitter 65, but may also be offset with a non-linear optics path defined between the image intensifier and the beamsplitter. Image intensifier 62a is preferably a late model version, such as Generation III, or an earlier model version, such as Generation II.

While the second channel sensor may be any suitable sensor, for purposes of the present disclosure, the second channel sensor will be described as an infrared camera 62b. The infrared camera is used to convert infrared imagery into a visible image. The infrared camera may be based on an uncooled focal plane array (FPA) and may incorporate its own objective lens which is designed to provide a thermal video field of view (FOV) that is essentially the same as the field of view (FOV) of the image intensifier The optical axes of the infrared camera and image intensifier are aligned, generally, parallel to each other during assembly of the night vision goggle system. The objective lens focuses the infrared image 61b onto the thermal sensor which outputs a signal indicative of the image. A system electronics 69a receives the output signal from the thermal sensor and projects the image onto display 68. The display 68 is configured to provide an infrared image along a camera output path 63c to beamsplitter 65, at a substantially right angle relative to the path of the image intensifier image 63a.

The display 68 may have various configurations, for example, an emissive type, reflective type, or transmissive type. An emissive type is preferred for the present application since it offers the smallest package and consumes the least power, although reflective and transmissive type displays are encompassed herein. Emissive displays include electroluminescent displays, vacuum fluorescent displays, field emissive displays and OLEDS (organic LEDs). As the name implies, the emissive source emits light and does not require a separate light source.

The beamsplitter 65 includes a dichroic surface that is configured to control passage of the image intensifier image and the infrared camera video image along a camera output path 63b through the beamsplitter. The dichroic surface allows a predetermined percentage of light incident thereon to pass through, while reflecting the remainder of the light. For example, the dichroic surface may be configured to allow approximately 70-90 percent of the light incident thereon to pass through, while the remaining 10-30 percent is reflected. The percentage of light pass through may be varied and is not limited to the indicated range.

Completing the description of FIG. 6, NVG system 60 includes electronics 69a, battery 69b and controller 69c. The electronics 69a is associated with the image intensifier, the infrared camera and the video display 68. The electronics is also associated with battery 69b and controller 69c. The battery supplies power to each of the components of the NVG system. The controller is configured to control the image intensifier and the infrared camera.

Figure 7A:
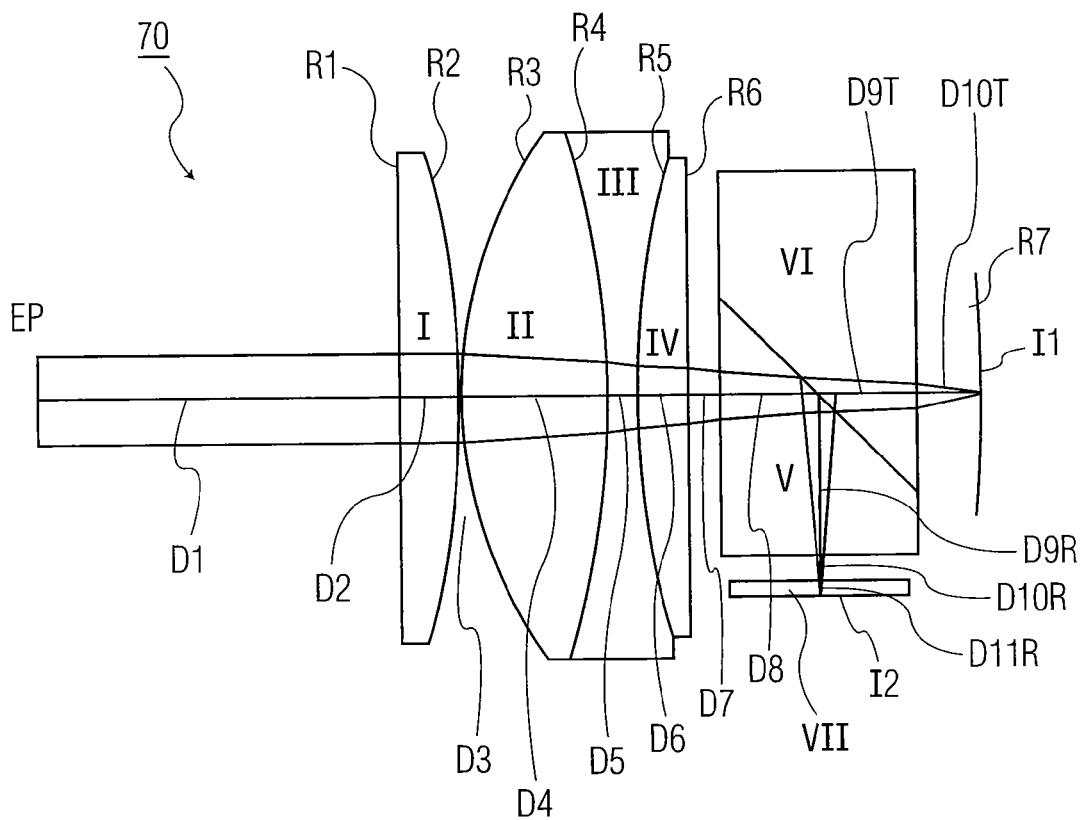
FIG. 7A is a schematic block diagram of a lens system, similar to the lens system of FIG. 5, showing details of each lens surface and distances between each lens surface, in accordance with an embodiment of the present invention.

Referring next to FIG. 7A, there is shown another exemplary embodiment of the present invention, generally designated as lens system 70, or magnifier/eyepiece 70. As shown, magnifier/eyepiece 70 provides an image to an observer's eye, designated as EP (eye's pupil). The eye of the observer looks through the magnifier/eyepiece and sees a fused image, which is a superposition of anode screen $I_1$ and display $I_2$.

As viewed from left to right, the magnifier/eyepiece includes a singlet lens I of positive power, and a triplet lens II, III and IV of positive power having its convex side facing the observer. The surfaces of the triplet lens are cemented together. Also shown are two glass plates V and VI cemented together to form a beam combining prism. A parallel plate of clear glass acts as a dust protector for display $I_2$.

The radii R1 and R6 are infinite, thereby forming flat surfaces, as listed in Table 2. Radius R7 of screen $I_1$ is −110 mm.

Surfaces R2, R4 and R5 have the same radius of curvature.

Still referring to FIG. 7A and Table 2, "f" is the effective focal length, R1, R2, . . . R7 are the radii of each surface. The R7 is the radius of the anode screen. The display is flat. The diameters D1, D2, . . . D9 are the thicknesses of the various elements (lenses and prism) and air spaces. The diameter D10T is the distance of the air space in the transmitted path. The diameters D9R, D10R, and D11R are the distances in the reflected path. The infinity symbol indicates a flat surface, "f/" is the f-number, $n_d$ is the refractive index in d light, and $V_d$ is the d partial dispersion.

Figure 7B:
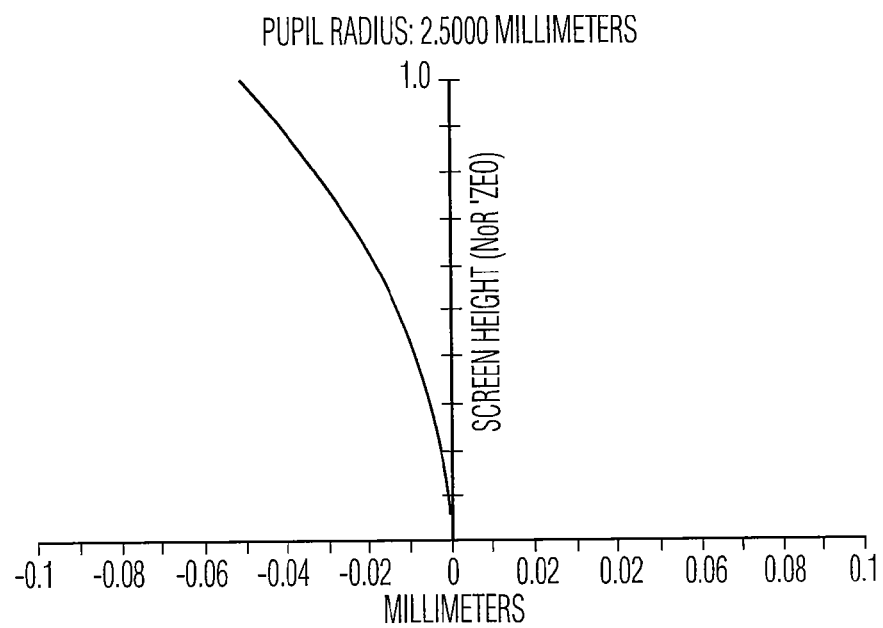
FIGS. 7B, 7C and 7D are aberration curves of the lens system of FIG. 7A, in accordance with an embodiment of the present invention.
Figure 7C:
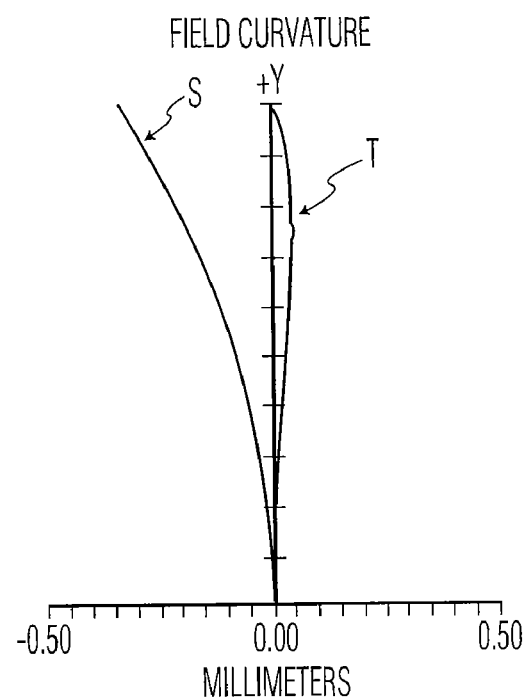
Figure 7D:
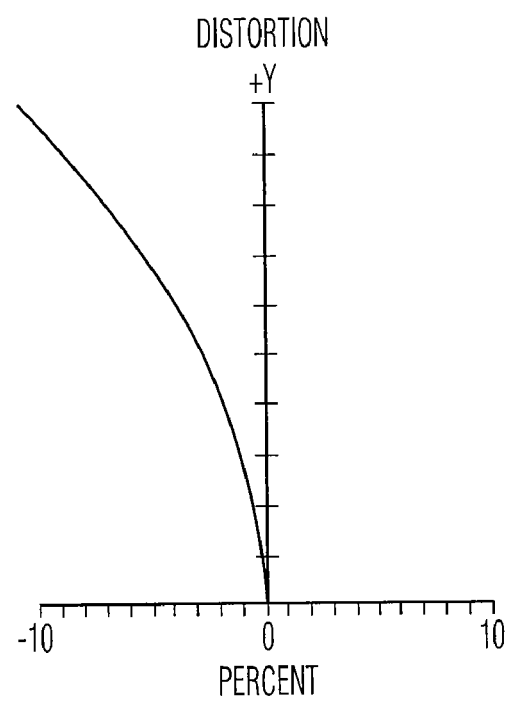

FIGS. 7B, 7C, and 7D show the aberration curves for spherical aberrations, astigmatism/field curvature and distortion at 540 nm wavelength for the magnifier/eyepiece shown in FIG. 7A. It may be observed that the magnifier/eyepiece is well-corrected for a field angle of 2°×27.5°, while the pupil distance is 1.1 f.

Figure 8:
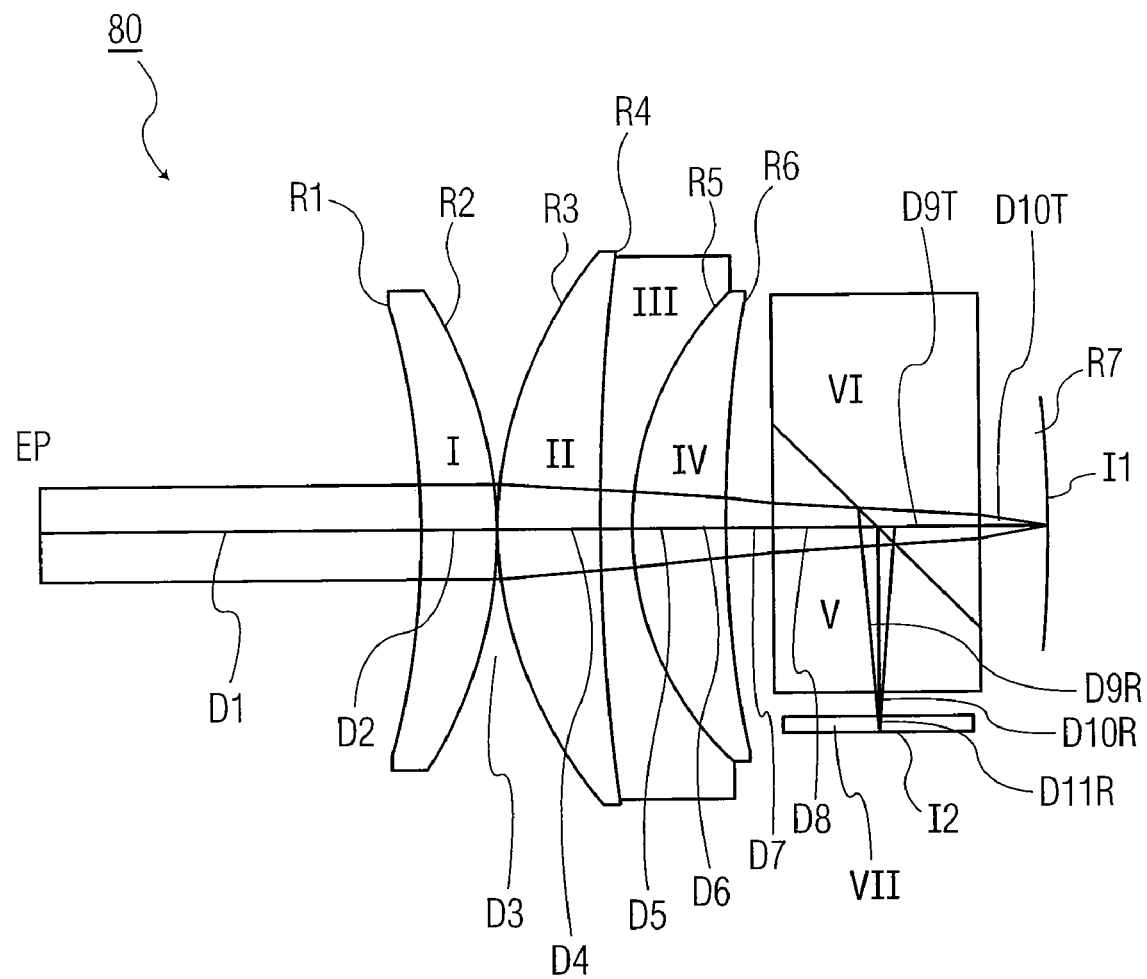
FIG. 8 is a schematic block diagram of another lens system, similar to the lens system of FIG. 5, showing details of each lens surface and distances between each lens surface, in accordance with an embodiment of the present invention.

Referring next to FIG. 8, yet another embodiment of the present invention is shown as magnifier/eyepiece 80, and is specified in detail in Table 3. As shown, singlet I has two curved surfaces R1 and R2. Furthermore, surface R6 of Triplet II, III, IV is also curved. The screen $I_1$ has a curved surface R7 of −56.9 mm. Accordingly, all lens surfaces are spherical.

TABLE 3

Specification of the Elements for lens system 80 shown in FIG. 8.

f = 22.73    f/0.7

| Radii | Thickness | $n_d/V_d$ |
|---|---|---|
| R1 = −53.820 | D1 = 24.000 | 1.883/40.8 |
| R2 = −27.772 | D2 = 4.750 | |
| R3 = 25.519 | D3 = 0.100 | 1.883/40.8 |
| R4 = 122.135 | D4 = 6.522 | 1.923/18.9 |
| R5 = 20.123 | D5 = 2.000 | 1.883/40.8 |
| R6 = 75.278 | D6 = 6.020 | |
| R7 = −56.9 | D7 = 3.0 | |
| | D8 = 6.500 | 1.834/37.2 |
| | D9 = 6.500 | 1.834/37.2 |
| | D10T = 4.372 | |
| | D9R = 10.500 | 1.834/37.2 |
| | D10R = 1.521 | |
| | D11R = 0.910 | 1.517/64.2 |

Figure 9:
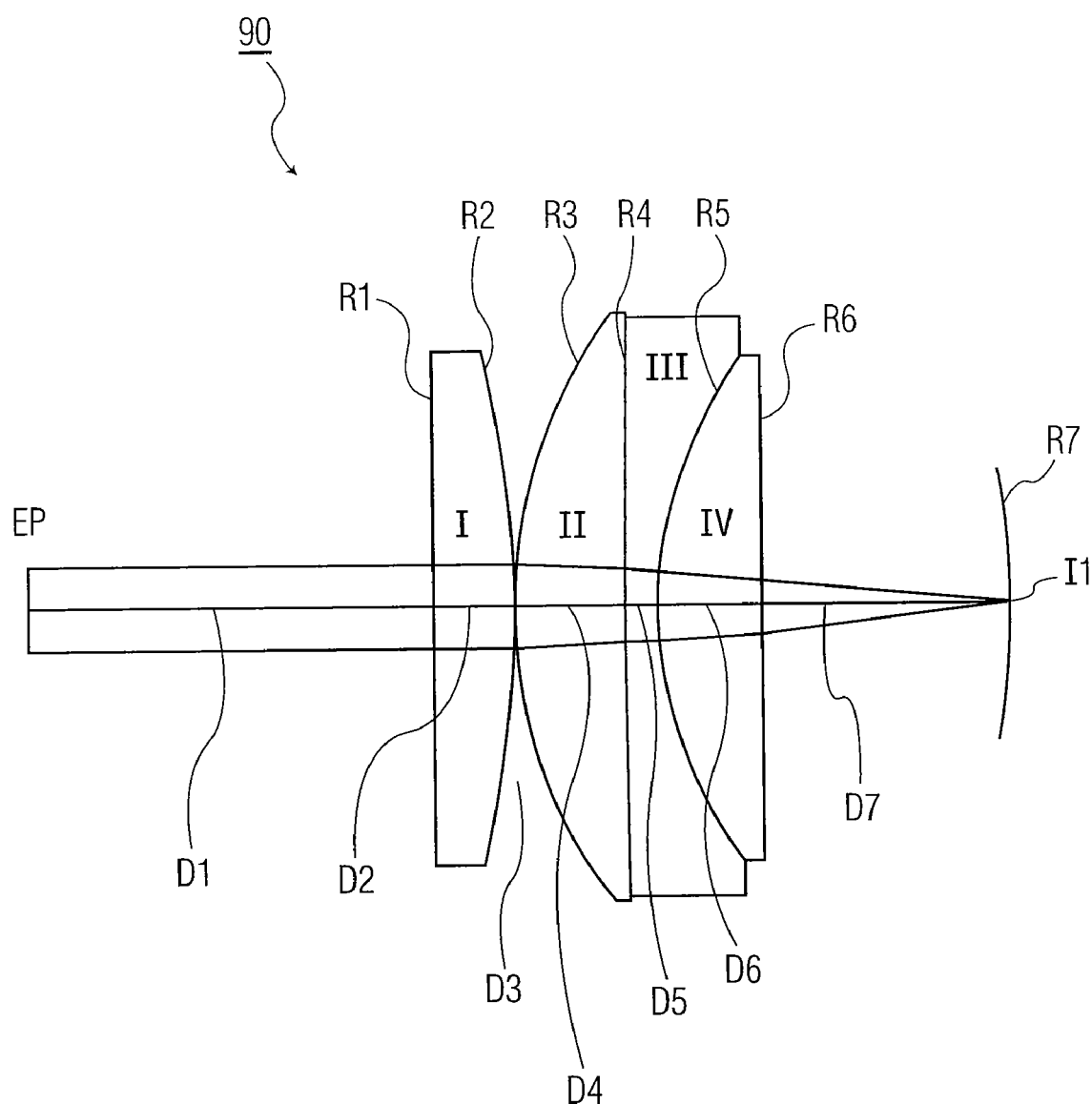
FIG. 9 is a schematic block diagram of yet another lens system, similar to the lens system of FIG. 5, showing details of each lens surface and distances between each lens surface, in accordance with an embodiment of the present invention.

Lastly, referring to FIG. 9 and corresponding Table 4, there is shown yet another embodiment of the present invention. As shown, magnifier/eyepiece 90 includes singlet I and triplet II, III, IV. Surfaces R1 and R6 are flat. Anode screen $I_1$ has a radius of curvature R7 of −40 mm. The prism and the display have been removed.

TABLE 2

Specification of the Lens Elements shown in FIG. 7A (in mm).

f = 21.95    f/0.7

| Radii | Thickness | $n_d/V_d$ |
|---|---|---|
| R1 = ∞ | D1 = 24.000 | 1.883/40.8 |
| R2 = 57.443 | D2 = 4.000 | |
| R3 = 28.422 | D3 = 0.100 | 1.883/40.8 |
| R4 = 57.443 | D4 = 9.750 | 1.923/18.9 |
| R5 = 57.443 | D5 = 2.000 | 1.883/40.8 |
| R6 = ∞ | D6 = 3.250 | |
| R7 = −110 | D7 = 2.200 | |
| | D8 = 6.500 | 1.834/37.2 |
| | D9 = 6.500 | 1.834/37.2 |
| | D10T = 2.431 | |
| | D9R = 10.500 | 1.834/37.2 |
| | D10R = 1.521 | |
| | D11R = 0.910 | 1.517/64.2 |

TABLE 4

Specification of the Elements of Lens System 90 shown in FIG. 9.

f = 22.73    f/0.7

| Radii | Thickness | $n_d/V_d$ |
|---|---|---|
| R1 = ∞ | D1 = 24.000 | 1.883/40.8 |
| R2 = −59.761 | D2 = 4.750 | |
| R3 = 29.004 | D3 = 0.100 | 1.883/40.8 |
| R4 = 875.649 | D4 = 6.522 | 1.923/18.9 |
| R5 = 24.177 | D5 = 2.000 | 1.883/40.8 |
| R6 = ∞ | D6 = 6.020 | |
| R7 = −40 | D7 = 14.87 | |

Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. An eyepiece/magnifier comprising
a first lens axially aligned with a second lens, the first and second lenses configured to be sequentially positioned from a pupil image of a viewer,
wherein the second lens is formed as a triplet having three cemented elements;
the first lens includes a concave surface opposing a flat surface of the first lens,
the second lens includes a concave surface and a convex surface, and
the concave surface of the first lens and the concave and convex surfaces of the second lens have equal radii of curvatures.

2. The eyepiece/magnifier of claim 1 wherein
the first lens includes a flat surface facing the pupil image, and
a convex surface facing the second lens.

3. The eyepiece/magnifier of claim 1 wherein
the second lens includes a convex surface facing the first lens, and
a flat surface opposing the convex surface of the second lens.

4. The eyepiece/magnifier of claim 1 wherein
the second lens diverges light toward the first lens, and
the first lens converges light emitted from the second lens.

5. The eyepiece/magnifier of claim 1 wherein
an image screen is aligned axially along an optical line of the first and second lenses for projecting light sequentially from the image screen toward the second lens, the first lens and then the viewer, and
the light passing from the image screen to the viewer is free-of passing through any aspherical surfaces and free-of passing through any diffractive surfaces.

6. The eyepiece/magnifier of claim 1 wherein
the first and second lenses are configured for providing a field of view greater than 55 degrees, and
a modulation transfer function (MTF) better than 50% at 40 line pairs/mm.

7. The eyepiece/magnifier of claim 1 wherein
the first and second lenses are configured to have an effective focal length (EFL) of approximately 20.5 mm and an eye relief greater than 24 mm.

8. An eyepiece/magnifier comprising
a first lens axially aligned with a second lens, the first and second lenses configured to be sequentially positioned from a pupil image of a viewer,
wherein the second lens is formed as a triplet having three cemented elements,
wherein an image screen is aligned axially along an optical line of the first and second lenses,
a beam combiner is provided between the first and second lenses and the image screen, in axial alignment along the optical line,
a display is provided substantially perpendicular to the optical line, and
light emitted from the display and light emitted from the image screen are combined by the beam combiner for viewing by the viewer.

9. An eyepiece/magnifier comprising
a first lens axially aligned with a second lens, the first and second lenses configured to be sequentially positioned from a pupil image of a viewer,
wherein the second lens is formed as a triplet having three cemented elements,
wherein an image screen is aligned axially along an optical line with the first and second lenses for viewing by the viewer, and
the image screen includes a surface facing the first and second lenses that is substantially flatter than a surface having a 100 mm radius of curvature.

* * * * *